A. G. SCHAAD.
PROCESS AND MACHINE FOR FORMING CUTTERS.
APPLICATION FILED JUNE 26, 1919.
1,399,525.
Patented Dec. 6, 1921.
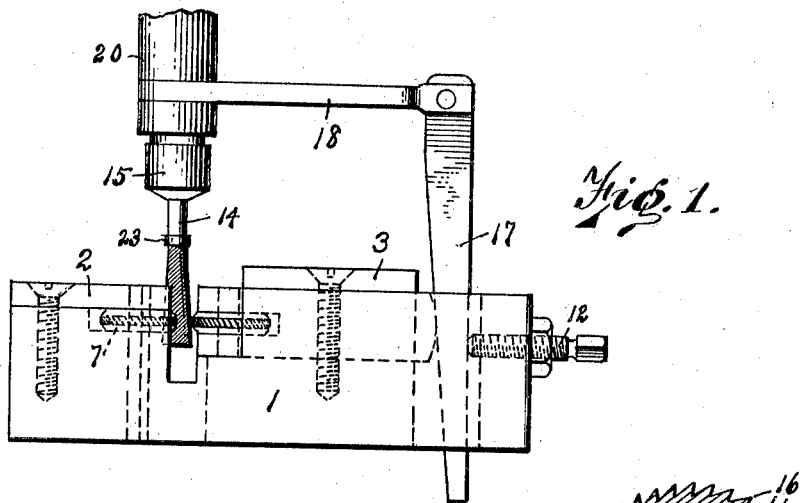
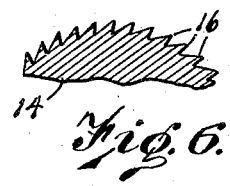
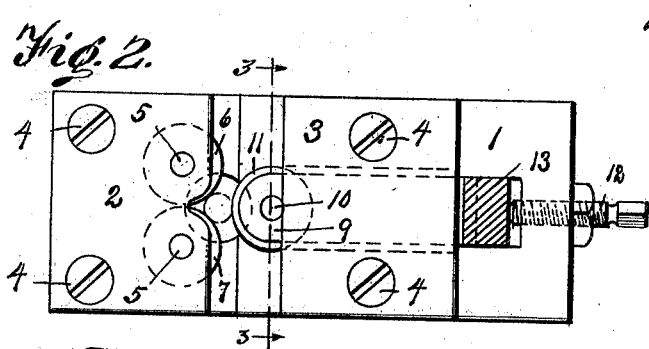
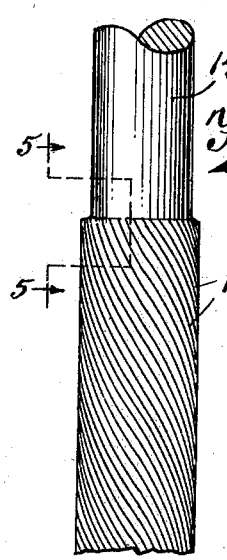
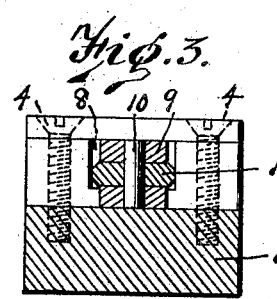
Inventor
Arthur G. Schaad
By Pagelsen and Spencer
Attorneys

UNITED STATES PATENT OFFICE.

ARTHUR G. SCHAAD, OF DETROIT, MICHIGAN.

PROCESS AND MACHINE FOR FORMING CUTTERS.

1,399,525.

Specification of Letters Patent.

Patented Dec. 6, 1921.

Application filed June 26, 1919. Serial No. 306,766.

*To all whom it may concern:*

Be it known that I, ARTHUR G. SCHAAD, a citizen of Switzerland, and residing at Detroit, in the county of Wayne and State of Michigan, have invented a new and Improved Process and Machine for Forming Cutters, of which the following is a specification.

This invention relates to rotatable cylindrical milling cutters whose teeth correspond to those on hand files, and its object is to provide a process and machine for producing cutters of this type.

This invention consists broadly in the process of rolling teeth on rotatable cutters as distinguished from cutting them, which is accomplished by passing a rotating blank back and forth between rotatable knurls and at the same time causing the knurls to approach each other to force the teeth of the knurls deeper into the blank. It further consists in a base and three knurls mounted on parallel axes, the axis of one of the knurls being mounted on a movable carriage so that the depth of the spaces and the height of the teeth on the blank may be controlled. It also consists in connecting a wedge to the rotatory head supporting the blank which wedge engages the carriage of the movable knurl so that the space between the knurls may be increased or decreased as the blank is moved back and forth between the knurls.

In the accompanying drawing, Figure 1 is an elevation of the machine for forming the teeth on the blank. Fig. 2 is a plan of a slightly modified type of this machine. Fig. 3 is a section on the line 3—3 of Fig. 2. Fig. 4 is an elevation of a completed cutter. Fig. 5 is a section on the line 5—5 of Fig. 4. Fig. 6 is a fragment of a transverse section of a cutter on a large scale.

Similar reference characters refer to like parts throughout the several views.

In the making of dies and other tools, it is often necessary to cut away the metal along certain established lines. The faces to be finished may be at right angles or at an oblique angle to the main plane of the work. By mounting a cylindrical cutter in a rotating head above a plane table, the die or other device may be slid along against the cutter until the unnecessary metal has been trimmed away. These cutters may be of any size, from one eighth of an inch in diameter, up, and of any desired taper, and I have found that when the teeth are made helical, as shown in Fig. 4, and spaced about fifty to the inch, a most desirable tool is produced.

The cost of cutting these teeth in the usual manner is substantially prohibitive and the resulting teeth are neither even nor as strong as when produced by rolling the metal of the blank between toothed rollers which indent the metal of the blank and force up the teeth from the body of the blank and at the same time compress the metal.

The machine necessary to produce these teeth may be very simple and that shown in the drawing consists in a base 1 having two cap plates 2 and 3 held down by screws 4. In this base and the plate 2 are the pins 5 which serve as journals for the knurls 6 and 7. The base is formed with a longitudinal groove 8 to receive the carriage 9 which carries the pin 10 and knurl 11. This carriage is positioned by the screw 12 and a block 13 if desired.

These knurls are formed with teeth which are the complements of the teeth to be formed on the blank and a cross section of a knurl is the same as Fig. 6 which is that of a cutter. The blank 14 for a cutter is mounted in a rotatable head 15 and moved up and down between the knurls while turning, the knurls being forced together by the set screw 12 until the teeth of the knurls are fully embedded in the blank, at which time the teeth 16 on the blank will be fully formed. When properly done the teeth of the cutter are sharp, even and smooth.

When tapering cutters are desired the blank is properly formed and the knurls may be moved toward each other by means of a wedge 17 between the outer end of the carriage 9 and the screw 12, which wedge is moved up and down in any desired manner, preferably by an arm 18 connected to the sleeve 20 which carries the rotating head 15.

If desired, the cutter may be provided with a bearing collar 23 to engage one portion of the work and guide it relative to the toothed portions of the cutter. It will be understood that the base 1 must be free to move as the knurl 11 is moved in and out. Also that the teeth on the knurls must all be of the same size, inclination and spacing so that the teeth of each one will fit exactly into the depressions made by the teeth of each of the others. The inclination of the teeth will determine the pitch of the helices of the teeth of the cutter and may be from substantially nothing to more than forty degrees. Also that the longitudinal movement of the blank is only relative and that the actual movement may be by the knurls.

I claim:—

1. A machine for forming teeth on cutter blanks which consists of three knurls mounted on parallel axes, one of the knurls being movable transversely toward the others, means to rotate a blank and move it longitudinally between the knurls, and means connected to and operated by the blank rotating means to force the teeth of the transversely movable knurl into the metal of the blank while both are rotating.

2. A machine for forming teeth on cutter blanks which consists of three knurls mounted on parallel axes, one of the knurls being movable transversely toward the others, means to rotate a blank and move it longitudinally between the knurls, and means to force the teeth of the transversely movable knurl into the metal of the blank while both are rotating, said means embodying a wedge which is moved longitudinally with the rotating blank.

ARTHUR G. SCHAAD.